United States Patent Office 2,859,747
Patented Nov. 11, 1958

2,859,747
DUST RESPIRATOR

Gerhard K. E. H. Stampe, Lubeck, Germany, assignor to Firma Dragerwerk, Heinr. & Bernh. Drager, Lubeck, Germany Application February 8, 1954, Serial No. 408,937

Claims priority, application Germany February 9, 1953

11 Claims. (Cl. 128—146)

This invention relates to dust filters. In particular, it is directed to a respirator face mask.

Conventional dust respirators generally comprise a half-face mask carrying the dust filter in a container. In some types, the face mask is provided with a fitting, such as a threaded fitting, to which a dust filter attachment is connected. The primary disadvantage of these respirators is that the filter unit is supported entirely by the face mask. A further disadvantage is that the filter container cannot exceed a certain size in order to not over-burden the mask, and particularly not to interfere with the field of vision. This produces further disadvantages in that the filter unit is so small that it offers a relatively high resistance to the passage of air therethrough. Attempts to enlarge the filter have not been practical because of the difficulties of supporting the same on the mask.

Other types of filters are those which are carried on the back of the user, the filter being carried in a sack having a hose connection fitting. Two hoses extend from the sack over the shoulders, and over either side of the neck to a half-face mask. The filter sack, made of woven fabric, filters out coarse dust particles but not all of the fines. Moreover, such respirators hinder the activities of the wearer.

In my co-pending application for "Dust Filter," filed January 5, 1954, I have disclosed a respirator in which both fine and coarse filters are combined in a tube which extends from the face mask around the neck of the wearer. The objects of the instant invention are to improve upon this construction, and in particular to make the filters more or less self-sustaining, and to increase the surface area of the fine filter.

In general, these objects are accomplished by forming the fine and coarse filters as concentric tubes with the coarse dust filter being outermost. Thus, the inner fine dust filter can be made substantially co-extensive with the coarse dust filter and has a greatly increased surface area over the construction disclosed in my aforesaid application. The inner dust filter can be made of materials which are rigid or semi-rigid so that the filter unit is more or less self-supporting. The filter retains the advantages of filtering the fine dust particles in a device which does not interfere with the movements of the wearer.

Figure 1:
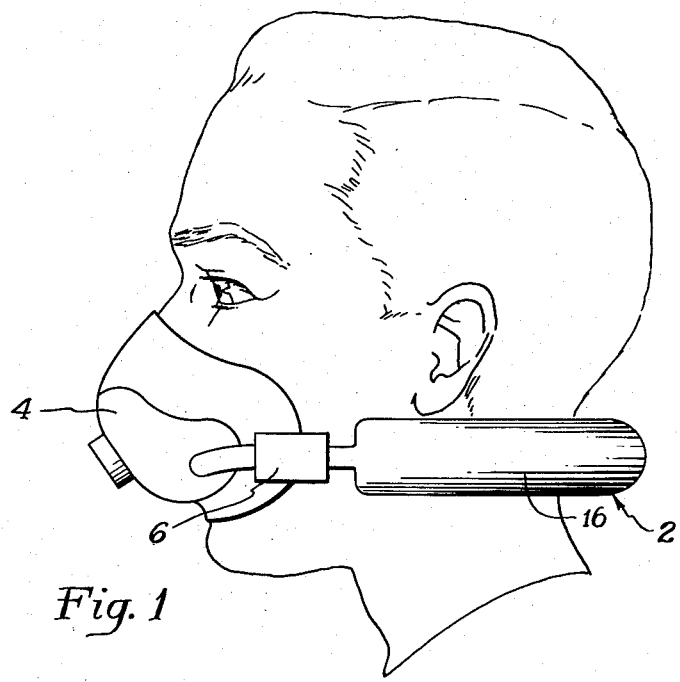
Figure 2:
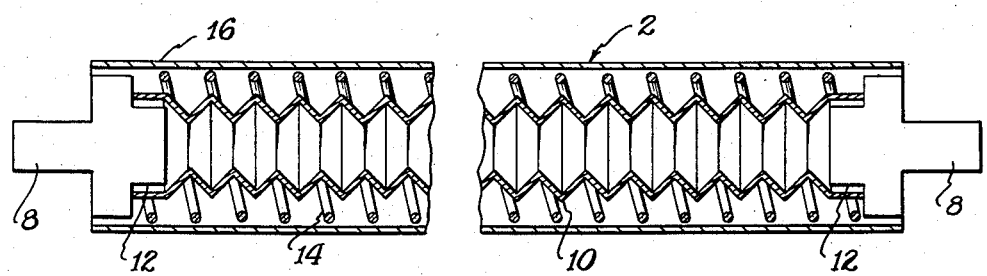

The means by which the objects of the invention are obtained are described more fully with reference to the accompanying drawings, in which:

Figure 1 is a side elevational view of the filter unit attached to a mask and being in place upon the head of a wearer, and Figure 2 is a cross-sectional view of the filter unit uncurved.

The filter unit 2 is connected to the half-face mask 4 through suitable coupling fittings 6. The filter unit is composed of two flanged coupling connectors 8, between which extends the tubular fine dust filter 10. The ends 12 of the tubular filter 10 are attached to the flanged mouth-piece of coupling elements 8. Surrounding the filter 10 is a spacing element 14, which is preferably in the form of a coiled spring, and which also is held in place by the coupling elements 8. The outer coarse dust filter 16 extends between coupling elements 8 and is secured to the outer edges of the flanged portions of the element.

In order to give the fine dust filter 10 as great an outer surface layer as possible, the surface of the tube is pleated, and may have as shown the form of accordion pleats. The number and form of the pleats are such as to give as large a surface area as possible, without materially interfering with the passage of air through the filter.

Filter 10 is composed of a relatively stiff self-supporting fine dust filter paper. It may also be composed of a tubular screen element having a pleated surface and of flexible material upon which is deposited a cohesive layer of fine dust filter material. Thus, the tubular screen element also forms a support for the filter. This has the primary advantage in that the filter material deposited on the screen need not be so thick as to be self-supporting. A further advantage is that mechanical loads are absorbed by the supporting framework while the filter unit proper is not subject to any appreciable load. Another advantage is that the screen element can be preformed to any shape so as to increase its surface area and it does not need to be pleated or worked on after the filter material is deposited thereon with the danger of injuring the filtering properties of the element. The tubular screen is composed of flexible material such as a wire screen or a screen made of synthetic strands. The filter coating is applied by immersing the screen in an aqueous suspension of the filter material and then creating a low pressure in the core of the screen so that the particles of filter material are drawn onto and deposited upon the screen. The filter material is then dried upon the screen. The spacing element 14 in the form of a coil spring serves to separate the coarse filter from the fine filter. It provides the further advantage of protecting the fine filter 10 in the event that the filter unit is squeezed.

Coarse dust filter 16 is composed of a tubular woven fabric, either of textile or metallic material. This coarse dust filter is supported by the spacing element 14, and has its ends closed off by the flanged portion of the connecting elements 8.

As disclosed in my aforesaid co-pending application, filter unit 2 can be supported by straps attached to the head strap of the face mask. The filter unit can likewise be attached to the edge of a cap or a helmet, with the edge of the helmet partially, or entirely, overlying the unit and protecting the same from mechanical damage as by falling rocks.

In some instances, the filter unit can function as the supporting strap for the face mask. The face mask is held in place by the usual neckband, not shown. Alternatively, the unit itself may be adapted to function as the neckband.

It has thus been shown that the filter unit described herein has the advantage of having a large surface area so that there is small resistance to air passing therethrough, while both the coarse and fine dust are filtered from the air. Furthermore, the coarse dust filter can be freed from adhering dust by merely tapping or knocking it. For this purpose, handles may be attached to the unit in order to facilitate shaking the hose and thus cleaning the coarse dust filter.

Having now described the means by which the objects of the invention are obtained,

I claim:

1. In a dust respirator composed of a face mask and a dust filter unit connected to said mask, said unit having a shape adapted to fit around the neck of a wearer of the respirator, said unit comprising an inner tubular fine dust filter communicating with said mask and spaced from and enclosed within an outer coarse dust filter directly exposed to the atmosphere.

2. In a respirator as in claim 1, said filter unit further comprising concentric and substantially co-extensive inner and outer filters.

3. In a respirator as in claim 1, said inner fine dust filter further comprising a pleated tube.

4. In a respirator as in claim 1, said inner fine dust filter further comprising an accordion pleated tube.

5. In a respirator as in claim 1, said inner dust filter further comprising a flexible tubular screen having a coating of fine dust filtering material thereon.

6. A process for making a fine dust filter comprising immersing a tubular screen in an aqueous suspension of fine dust filtering material, creating a low pressure in the core of said tube to draw the filtering material onto the outer surface of said screen, withdrawing the thus coated screen from said aqueous suspension, and then drying the filter material coated screen.

7. In a respirator as in claim 1, further comprising a spacing element between the inner and outer filters.

8. In a respirator as in claim 7, said spacing element further comprising a coiled spring.

9. In a respirator as in claim 1, said coarse dust filter further comprising a fabric tube.

10. In a respirator as in claim 9, said filter unit further comprising a supporting framework for said fabric tube.

11. In a respirator as in claim 10, said supporting framework further comprising spacing means between the inner and outer filters.

References Cited in the file of this patent

UNITED STATES PATENTS

| | | |
|---|---|---|
| 1,288,856 | Farr | Dec. 24, 1918 |
| 1,798,164 | Kuhn et al. | Mar. 31, 1931 |

FOREIGN PATENTS

| | | |
|---|---|---|
| 27,118 of 1896 | Great Britain | Oct. 16, 1897 |
| 319,673 | Italy | July 17, 1934 |
| 50,786 | France | Dec. 24, 1940 |
| 877,515 | France | Sept. 7, 1942 |